United States Patent

[11] 3,622,713

[72] Inventors Henri F. Lassaigne
13 Residence du Parc de Courcelles, Gif-sur-Yvette;
Serge A. Jeanclaude, 14 Avenue Jean Jaures, Villeneuve-la-Garenne, both of France

[21] Appl. No. 39,955
[22] Filed May 25, 1970
[45] Patented Nov. 23, 1971
[32] Priority June 5, 1969
[33] France
[31] 69 18546

[54] THREE-TERMINAL ELECTRONIC DIFFERENTIAL COUPLER FOR TELEPHONE CIRCUITS
8 Claims, 12 Drawing Figs.

[52] U.S. Cl. .......... 179/170 NC, 179/170 G
[51] Int. Cl. .......... H04b 3/16, H04m 1/60
[50] Field of Search .......... 179/170 G, 170 NC

[56] References Cited
UNITED STATES PATENTS

| | | | |
|---|---|---|---|
| 3,042,759 | 7/1962 | Bonner | 179/170 G |
| 3,180,945 | 4/1965 | Haselton et al. | 179/170 NC |
| 3,530,260 | 9/1970 | Gaunt | 179/170 NC |

*Primary Examiner*—Kathleen H. Claffy
*Assistant Examiner*—William A. Helvestine
*Attorney*—Abraham A. Saffitz

ABSTRACT: A three terminal electronic differential coupler adapted to replace a hybrid coil in a three-circuit telephone system, in which a first and a second of said terminals are at a variable potential, while the third terminal is at ground potential. A first one of said circuits having a given impedance is connected between said first and second terminals, while the second and third circuits, each having an impedance substantially equal to one-fourth of said given impedance, are respectively connected between said first and third terminals and said second and third terminals. A ground symmetrical impedance substantially equal to the negative of said given impedance is produced between said first and second terminals by means of a suitable electronic circuit. The arrangement makes its possible to transmit signals from said first circuit to both said second and third circuits, without transmitting signals between said second and third circuits.

INVENTORS:
Henri F. LASSAIGNE
and Serge A. JEANCLAUDE
By: Abraham A. Saffitz
ATTORNEY INVENTORS:
Henri F. LASSAIGNE
and Serge A. JEANCLAUDE
By: Abraham A. Saffitz
ATTORNEY INVENTORS:
Henri F. LASSAIGNE
and Serge A. JEANCLAUDE
By: Abraham A. Saffitz
ATTORNEY INVENTORS:
Henri F. LASSAIGNE
and Serge A. JEANCLAUDE
By: Abraham A. Saffitz
ATTORNEY

INVENTORS:

Henri F. LASSAIGNE
and Serge A. JEANCLAUDE,

By: Abraham A. Saffitz
ATTORNEY

THREE-TERMINAL ELECTRONIC DIFFERENTIAL COUPLER FOR TELEPHONE CIRCUITS

This invention relates to a three-terminal electronic differential coupler, the functioning of which is comparable to that of a conventional coupler having a hybrid coil, as used when connecting telephone circuits of the so-called "two-wire" type to those of the so-called "four-wire" (two-line) type.

In a three-terminal, electronic differential coupler, one of the terminals is usually grounded; the other two terminals are respectively connected, for example, to the wires of the two-wire circuit. On the other hand, one of the nongrounded terminals and the grounded terminal are respectively connected to the two wires of one of the halves of the four-wire circuit, while the other nongrounded terminal and the grounded terminal are respectively connected to the two wires of the other half of the four-wire circuit.

It will be shown below that, if a coupler of this type is subject to operating conditions which are similar, from the point of view of impedance matching, to those which obtain in a hybrid coil coupler, it is absolutely compulsory that the said coupler, when connected to the two lines of the four-wire circuit, should have, between its two terminals which are not connected to earth, a negative admittance, the conductance and susceptance of which are equal in terms of absolute values, but have signs which are the opposite of those of the two-wire line.

In addition, for forming a coupler of this kind, it is possible to use only networks which are related to the so-called "negative impedance" converters of the type known as "short circuit stable," and even then, only on condition that their structures have a special symmetry which will be indicated more specifically below.

Couplers having active components, such as transistors or electronic valves, are already known in the prior art.

Among these, it is appropriate to mention the coupler described in U.S. Pat. No. 3,227,812, entitled "Forked-circuit data transmission installations" issued Jan. 4, 1966 to M. Schlichte.

This coupler is a three-terminal system constituted by a transistor, the collector circuit of which comprises an impedance of a suitable value. It permits the connection, to one common transmission track for both directions of transmission, of a unidirectional sending track and a unidirectional reception track, the reception track being decoupled in relation to the sending track.

A circuit of this kind may replace the hybrid coil of a conventional telephone set, but does not offer sufficient symmetry for the formation of certain telephone circuits which must have precise balance.

Among the electronic tube couplers, it is possible to quote the one described in French Pat. No. 1,009,763 of June 23, 1948, entitled "Electronic differential system" which was filed in the name of "Lignes Telegraphiques et Telephoniques."

This coupler may replace a hybrid coil coupler in which impulses of very short duration and having a very low repetition frequency are transmitted. It is constituted by an electronic tube, the functioning of which differs according to its manner of excitation. The load impedance of this tube comprises two parts: one in its anode circuit, the other in its cathode circuit. In the sending operation mode, two signals of equal amplitude but of opposite phase are developed at the input connected to the receiver in order to block it. In the receiving operation mode, the signal received passes through only one of the parts of the load impedance, and can therefore supply the reception circuit.

It will be seen, in the following, that a coupler of this kind is fundamentally different from the coupler of the invention.

Another type of coupler having electronic components and three pairs of terminals is described in the U.S. Pat. Ser. No. 3,180,947 published on Apr. 27, 1965, in the names of Ernest F. Haserton and Rudolf V. Hergenrother and entitled "Electronic bridge hybrid circuit." This coupler is constituted by a circuit in the form of a Wheatstone bridge, the four arms of which are constituted by transistor amplifiers. The two-wire line and a balancing impedance are respectively connected to two of the apices of the bridge. The two lines of the four-wire circuit are respectively connected to the other two apices of the same bridge.

This arrangement, which is not of the three-terminal type, has a manner of functioning which is fundamentally different from that of the coupler of the present invention.

According to the present invention, there is provided a three-terminal, electronic, differential coupler having a first terminal and a second terminal, the potentials of which are variable relative to a reference potential described as the "ground potential," wherein the line of a two-wire telephone circuit having a given impedance is connected between the said first and second terminals, while the two lines of a four-wire telephone circuit both having an impedance substantially equal to one-fourth of the said given impedance are respectively connected, one between the said first and third terminals, and the other between the said second and third terminals, the coupler comprising a negative impedance converter formed by a circuit having transistors symmetrically arranged in relation to a point at the said reference potential, and having, between its two utilization terminals, a negative impedance which is substantially equal in absolute value, but opposite in respect of its algebraic sign, to the said given impedance, the said two utilization terminals respectively constituting the said first and second terminals and the said third terminal being directly connected to the said point at the said reference potential.

The "ground potential" may be any reference potential.

In a simple embodiment of the invention, the said negative impedance converter uses two pairs of transistors of the same type of conductivity, each transistor of one pair having its emitter connected to the collector of a transistor of the other pair, and a balancing impedance being connected between the collectors of the transistors of the said other pair.

In another embodiment of the invention, the said negative impedance converter uses four transistors forming two pairs of opposite types of conductivity, with the collector of each element of one pair connected to that of an element of the other pair, while the said balancing impedance is connected between the emitters of the elements of the pair initially mentioned.

In the above-mentioned embodiments of converters, the cross-couplings between the base electrode of one transistor of a pair and the collector of the other transistor of the same pair are preferably formed by Zener diodes.

Finally, in an important application of the invention to a telephone network with collective calls, there are envisaged, in each principal (calling) set or secondary (called) set, an assembly comprising a differential coupler according to the invention, in combination with two unidirectional amplifiers.

Embodiments of the invention will now be described, by way of example only, with reference to the accompanying drawings, in which.

Figure 1:
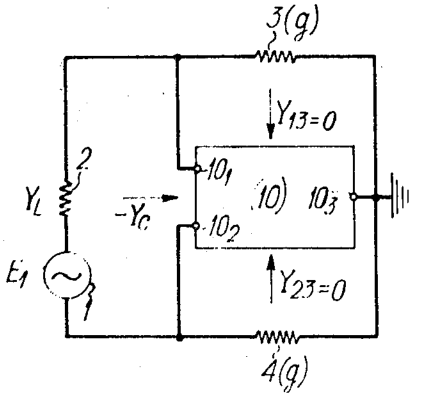
FIGS. 1 and 2 are simplified diagrams which make it possible to define the operating conditions of a coupler having three terminals.
Figure 2:
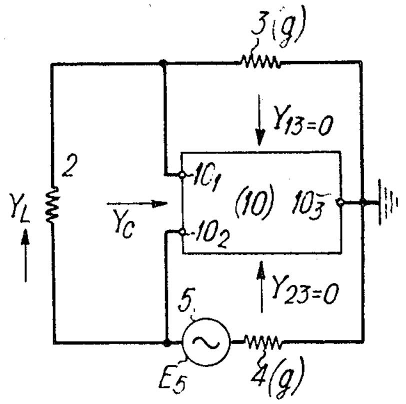
Figure 6A:
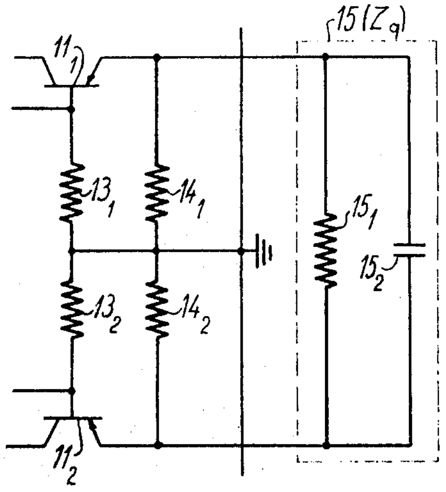
Figure 6B:
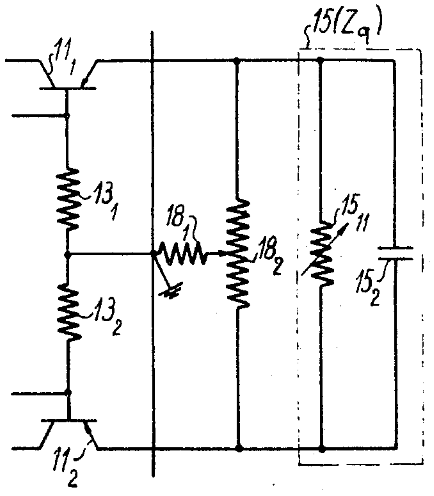
Figure 7:
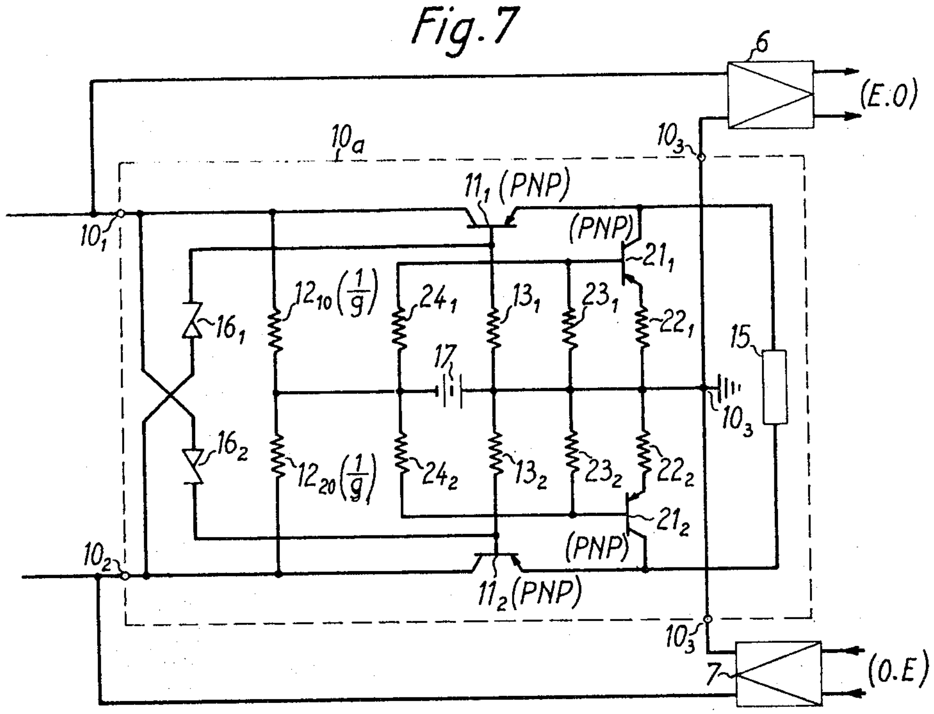
Figure 8:
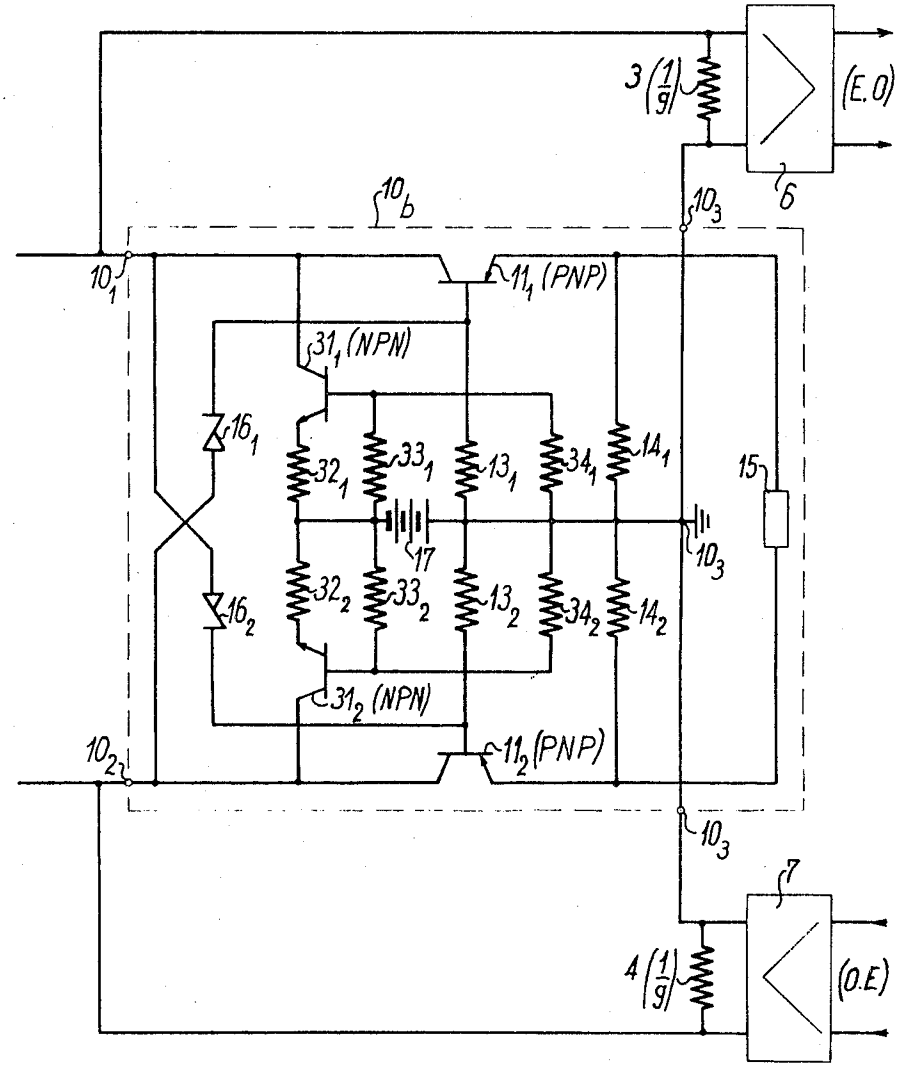
Figure 9:
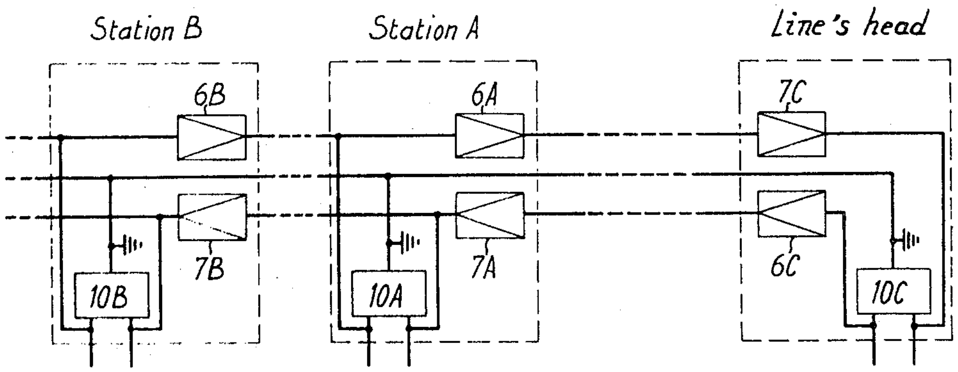
Figure 10:
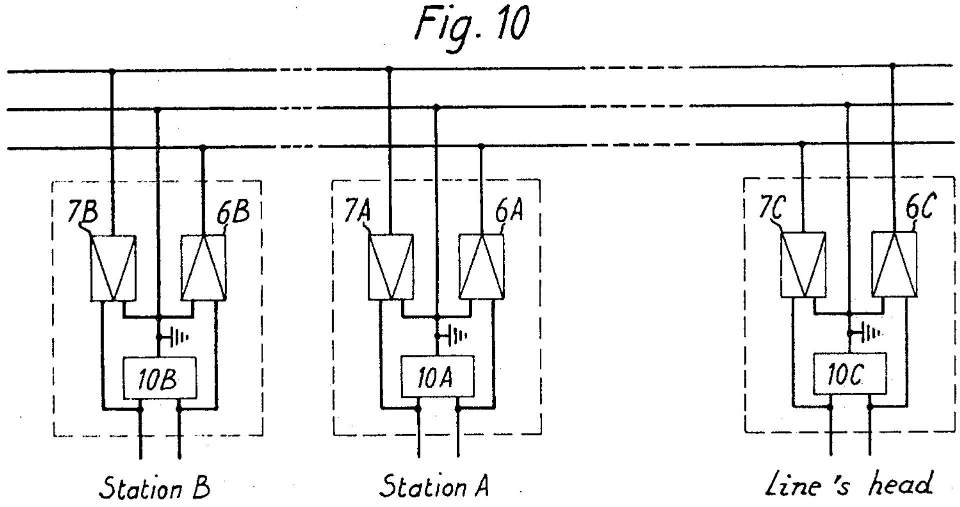
Figure 11:
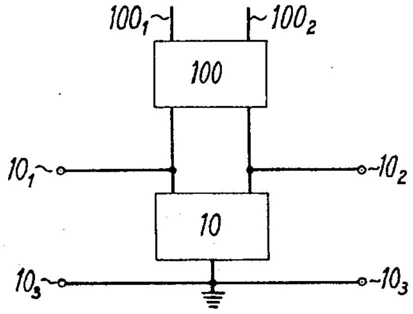

FIGS. 6 (*a*) and 6 (*b*) show regulating members which can be inserted in the circuit according to the invention;

FIGS. 7 and 8 show two variants of the coupler according to the invention;

FIGS. 9 and 10 deal with a form of telephone operation called "collective calls" type, in which couplers according to the invention may be used;

FIG. 11 shows a separator circuit for signals, the frequencies of which have values which do not belong to the same bank of frequencies. Referring first of all to FIGS. 1 and 2, these make it possible to define the conditions of operation of an electronic coupler 10 with three terminals $10_1$, $10_2$, $10_3$, such as the coupler of the invention.

The terminal $10_3$ being at a well-defined, constant potential, for example that of ground, the coupler 10 has the following features:

the admittance $Y_c$, observed between terminals $10_1$, $10_2$, has a negative real part, the admittances $y_{13}$, $Y_{23}$, observed respectively between the terminals $10_1$, $10_3$ and $10_2$, $10_3$, are very low and, consequently, may be regarded as practically zero.

As regards the closure admittances connected to the terminals of the coupler 10, they have the following features:

the admittance 2, connected between the terminals $10_1$, $10_2$, is passive, that is to say it has a positive real part, the admittances 3 and 4, connected respectively between the terminals $10_1$, $10_3$ and $10_2$, $10_3$, are two admittances of the same value, substantially equal to four times admittance 2.

a. Operation in the West-East direction (FIG. 1).

In this case, an alternative source 1 of electromotive force $E_1$ is connected in series with the admittance 2.

$a_1$. The first condition to be imposed is the matching of the admittance 2 to the admittance $Y_c$ observed between the terminals $10_1$, $10_2$ of the coupler 10, which is closed by the conductances 3 and 4.

If $Y_L$ is the value of the admittance 2, it is necessary to have:

$y_L = Y_c + g/2$ (1) $y_L$ being the imaginary conjugate quantity of $Y_L$ and $g$ the value of the conductances 3 and 4.

By inserting:

$$Y_L = G_L + j\,B_L$$

$Y_c = G_c + j\,B_c$ in which $j$ is the imaginary unit, the relationship (1) becomes:

$G_L - j\,B_L = G_c + j\,B_c + g/2$ the result of which is that:

$$G_c = G_L - g/2 \qquad (2)$$

$$B_c = (-B_L) \qquad (3)$$

Finally, there should appear, at the terminals $10_1$, $10_2$ of the coupler 10, an admittance $Y_c$ such that:

$Y_c = (G_L - g/2) - j\,B_L$ (4) the conductance of which is negative if:

$$G_L < g/2 \qquad (5)$$

$a_2$. The second condition imposed is that the power supplied by the source 1 should be equally distributed between the conductances 3 and 4.

Because of the matching of the admittance $Y_L$ and $(Y_c + g/2)$, the voltage between the terminals $10_1$ and $10_2$ is equal to $E_1/2$, and the power absorbed by the whole of the two conductances of value $g$, is therefore equal to:

$P = gE_1^2/8$ (6) The power supply by the source 1 is equal to:

$P = G_L\,E_1^2/2$ (7) By comparing expressions (6) and (7), it emerges that:

$g = 4G_L$ (8) Combination of the relationships (4) and (8) gives:

$$Y_c = -G_L - j\,B_L = -Y_L \qquad (9)$$

b. Operation in the East-west direction (FIG. 2); in this case, the signals received from the branch 4 are equivalent to an alternative source 5 of electromotive force $E_5$ connected in series with the conductance 4.

The relationship (9) shows that:

$Y_L + Y_c = 0$ and, consequently, the source 5 cannot supply signals to the conductance 3.

The power supplied by the source 5 is therefore wholly absorbed by the admittance 2.

The above considerations show that a three-terminal electronic coupler, such as that of the invention, cannot be formed by means of a three-terminal electrical network solely constituted by passive components, as is the case with conventional hybrid coil couplers.

In other words, a three-terminal electronic coupler should of necessity, comprise active components, such as transistors for example, suitably associated with passive, resistive and reactive components, in order to cause to appear, at the terminals $10_1$, $10_2$, of the said coupler, a negative admittance, the conductance $G_c$ and susceptance $B_c$ of which have signs which are opposite to those of the circuit connected to the terminals $10_1$, $10_2$.

Furthermore, the three-terminals, negative admittance network which is used as the coupler, must possess a symmetrical structure such that, if the unit 10 (FIGS. 1 and 2) is cut through a horizontal plane passing through the terminal $10_3$, any component situated in one of the half-units thus constituted also exists in the other half-unit, where it occupies a symmetrical position to that of the first, relative to the plane referred to.

Most networks known under the name of "converters of passive impedance into negative impedance," cannot therefore be used for the formation of a three-terminal coupler meeting the above requirements.

Only certain of them, which belong to the category of impedance converters described as "short circuit stable" have a structure which, judiciously modified, is capable of fulfilling the specified conditions.

Among these structures, it is appropriate to mention that described by J. G. LINVILL in the article entitled "Transistor negative-impedance converters" published in the U.S. Review "Proceeding of the I.R.E.," June 1953, pages 725 to 729.

In the following, a description will be given, by way of example only, of a three-terminal electronic coupler in conformity with the invention, the structure of which is based on that shown in FIG. 3*b* of the above-mentioned article.

Figure 3:
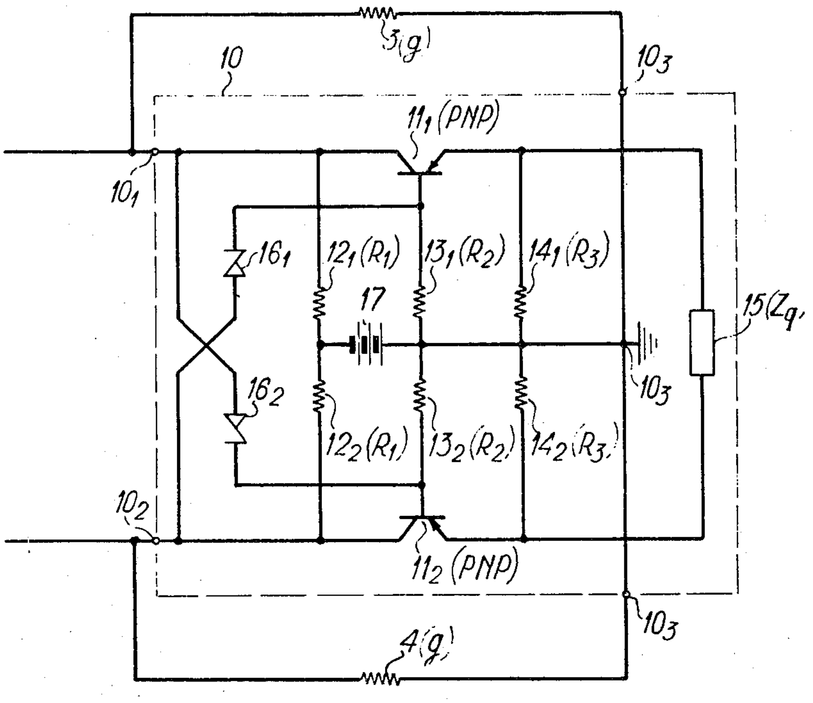
FIGS. 3 and 4 are circuit diagrams of three-terminal couplers in accordance with the invention.

FIG. 3 illustrates this structure.

In this FIG., $11_1$ and $11_2$ denote two transistors of identical characteristics, for example of the PNP-type, the emitters and bases of which are respectively connected to ground by resistors $14_1$, $14_2$, having the same resistance value $R_3$, and resistors $13_1$, $13_2$ having the same resistance value $R_2$.

The collector circuits of transistors $11_1$, $11_2$ each comprise a resistor $12_1$, $12_2$ with a very high resistance value $R_1$. The point common to these two resistors $12_1$, $12_2$ is connected to the negative pole of a DC bias source 17. The positive pole of the said source 17 is connected to ground (terminal $10_3$).

The arrangement of the elements in FIG. 3 is comparable to that of the elements of the LINVILL arrangement mentioned above. However, the coupler of FIG. 3 differs from the said arrangement in that:

a. The capacitors in the LINVILL arrangement which bring about direct feedback between the collector of transistor $11_2$ and the base of transistor $11_1$ and also that between the collector of transistor $11_1$ and the base of transistor $11_2$, are respectively replaced by Zener diodes $16_1$ and $16_2$.

The use of these diodes $16_1$ and $16_2$ has the advantage of bringing about, at the same time as the above-mentioned feedback and without introducing extraneous reactances, the biassing of the base of transistor 11*l* in relation to the collector of transistor $11_2$, and vice versa, because of the pronounced bend in the current-voltage curves of the said diodes.

b. The resistor in the LINVILL arrangement, which interconnects the emitters of transistors $11_1$, $11_2$, is replaced by an admittance 15 which has the value $Y_1$ and the conductance $G_q$ and susceptance $B_q$ of which have values which are suitable for ensuring the appearance, at the terminals $10_1$, $10_2$ of the coupler 10, of an admittance $Y_c$ such that:

$$Y_c = -Y_L \qquad (10)$$

If $G_3$ is the conductance which corresponds to the value $R_3$ of resistors $14_1$, $14_2$, it is known that the admittance $Y_c$ at the terminals $10_1$, $10_2$ is given by the approximate expression:

$Y_c = -\alpha(G_3/2 + Y_q)$ (11) $\alpha$ being equal to the current gain of transistors $11_1$, $11_2$ in common base connection.

By combining the relationships (10) and (11), it is possible to write:

$$-g_L - j\,B_L = -\alpha G_3/2 - \alpha G_q - j\,\alpha B_q \quad (12)$$

By selecting the values of resistors $14_1$, $14_2$ in such a way that the conductance $g_3$ has a very low value, the relationship (12) leads to the expressions:

$$G_L = \alpha G_q \text{ or } G_q = G_L/\alpha$$
$$B_L = \alpha B_q \text{ or } B_q = B_L/\alpha \quad (13)$$

The admittance 15 therefore performs a function comparable to that of the balancing impedance of hybrid coil couplers.

Figure 4:
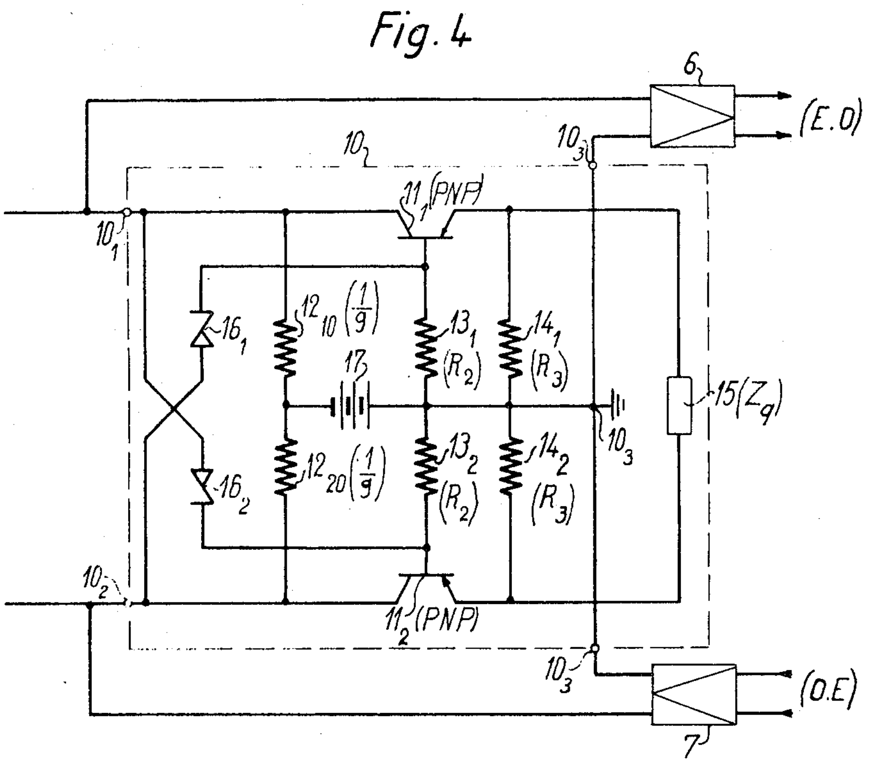

FIG. 4 illustrates the coupler according to the invention, in which the values of the resistances of resistors $12_1$ and $12_2$ have been modified because, in practice, the coupler 10 according to the invention is linked to the four-wire circuit through amplifiers 6 and 7.

The amplifier 6, which is used for the East-West direction, has a very high input impedance.

The amplifier 7, which is used for the West-East direction; has a very high output impedance.

In order to fulfill the conditions given above, it is therefore necessary to shunt the input of amplifier 6 and the output of amplifier 7 by means of admittances 3 and 4 having a value $g$ (FIG. 3).

A study of FIG. 3 shows that, if source 17 is of negligible internal resistance (which is the case in a telephone exchange, for example), the admittances 3 and 4 are shunted across resistances $12_1$, $12_2$. Since the latter have very high values, it is possible to replace them, as shown by FIG. 4, by resistances $12_{10}$ and $12_{20}$ having a value of $(1/g)$ ohms.

A coupler according to the invention, which proved satisfactory, had the specifications and performances indicated below.

The coupler, which was intended for a frequency band from 100 to 10,000 Hz., had its inputs $10_1$, $10_2$ connected to a telephone line, the real characteristic impedance term of which was substantially equal to 600 ohms in the above-mentioned frequency band.

According to the relationship $g = 4\,G_L$ (14) the values of the resistances $12_{10}$, $12_{20}$ (FIG. 4) must be equal to 150 ohms. In actual fact, these values are 156 ohms, experience having shown that the conductances which correspond to the resistances $13_1$, $13_2$, $14_1$, $14_2$ are not entirely negligible.

A. SPECIFICATIONS

These specifications are indicated without tolerances, since the coupler in question is an experimental device in which the components have been carefully selected.

Transistor $11_1$, $11_2$: Type P.N.P. — B C Z 11

Zener diodes $16_1$, $16_2$: Type M Z 5 A

Resistances $12_{10}$, $12_{20} \rightarrow 1/g = 156$ ohms

Resistances $13_1$, $13_2$: $\rightarrow R_2 = 13{,}000$ ohms

Resistances $14_1$, $14_2$: $\rightarrow R_3 = 5{,}100$ ohms

Impedance 15 constituted by a 607 ohm resistance in parallel with a 700 picofarad capacitor.

Supply source 17 $\rightarrow -36$ volts.

B. PERFORMANCES

The measured results indicated below were obtained with a level, at terminals $10_1$, $10_2$, of +0.5 Neper (referred to the zero level of 1 milliwatt).

1. Attenuation measured between terminals $10_1$, $10_2$ and $10_1$, $10_3$ or between terminals $10_1$, $10_2$ and $10_2$, $10_3$:
   $b_1 = 0.7$ Neper
2. Attenuation measured between terminals $10_1$, $10_3$ and $10_1$, $10_2$ or between terminals $10_2$, $10_3$ and $10_1$, $10_2$:
   $b_2 = 0$ Neper
3. Attenuations measured between terminals $10_1$, $10_3$ and $10_2$, $10_3$, and vice versa, as a function of frequency.

These attenuations, $b_3$, are grouped together in table I below.

TABLE I

| Frequencies in Hz, | $b_3$ attenuation in Nepers |
|---|---|
| 100 | 9.40 |
| 300 | 9.70 |
| 1,000 | 10.00 |
| 3,000 | 11.00 |
| 4,000 | 9.70 |
| 10,000 | 8.00 |

4. Attenuations measured at frequency of 1,000 Hz., between terminals $10_1$, $10_3$ and $10_2$, $10_3$, and vice versa, when the impedance of the two-wire line varies.

Figure 5:
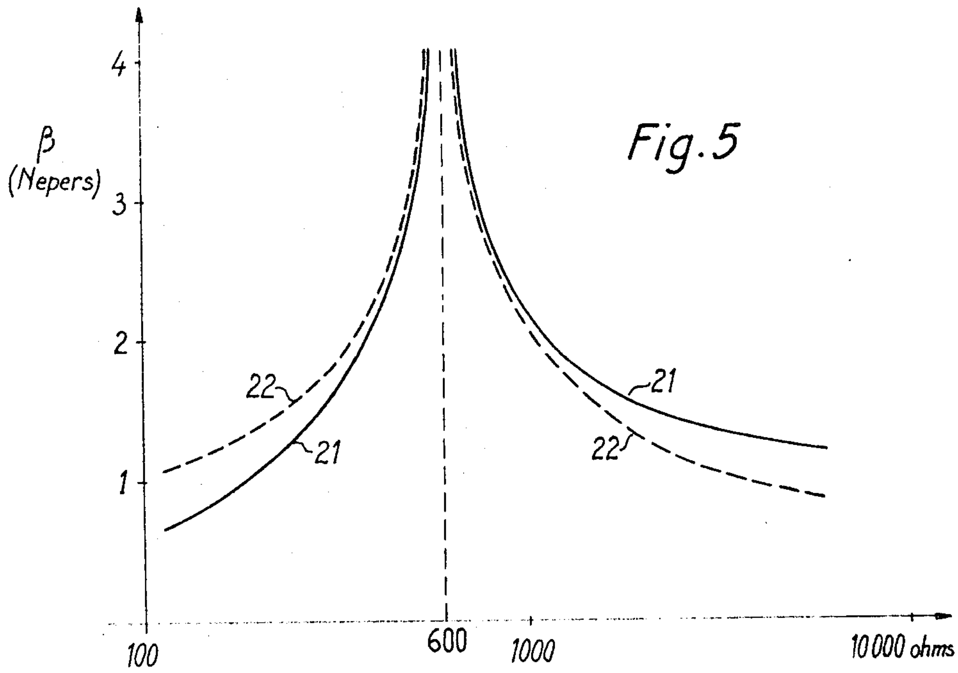
FIG. 5 illustrates two curves which make it possible to compare the effects of mismatching of the two-wire line on the respective functioning of a coupler according to the invention and of the conventional, hybrid coil coupler.

The results of these measurements are given in FIG. 5, which illustrates the curve 21 obtained, and contains, in abscissa and on a logarithmic scale, the real impedance value in ohms of the two-wire line and, in ordinates and on a linear scale, the attenuation value $b_4$ in Nepers.

The curve 22 represents the similar theoretical curve:

$$\beta = 0.7 + \log\left|\frac{Z+Z_1}{Z-Z_1}\right| \text{ Nepers} \quad (15)$$

relating to a conventional hybrid coil couple.

As may be seen, the two curves 21 and 22 are very approximately merged in the interval from 450 to 800 ohms.

In the interval between 100 and 450 ohms, the hybrid coil coupler is less sensitive to variations in the impedance of the two-wire line than the coupler according to the invention. In the interval between 800 and 10,000 ohms, the opposite is the case.

5. Power level permissible at terminals $10_1$, $10_2$:
   +0.9 Neper.

It is expedient to note that the arrangement of the invention lends itself to construction according to the so-called "integrated circuit" technique which, by its nature, permits suitable pairing of all the components, including diodes and transistors, of the said arrangement.

If use is made of an arrangement with discrete components, it should be noted that disparity of the diodes and transistors affects both the symmetry relative to ground and the balance of the system.

As regards symmetry, experience shows that it is possible to adopt, for all the components in the arrangement, tolerances below or equal to ±5 percent.

As regards balance, it may be redressed by inserting, in the arrangement according to the invention, known compensating elements such as, for example variable resistances connected to the terminals of diodes $16_1$ and $16_2$ (FIG. 4), a voltage dividing device replacing the assembly constituted by the two resistances $14_1$ and $14_2$, A voltage dividing device incorporating the resistances $14_1$, $14_2$ and part of the balancing resistance $15_1$, as shown in FIG. 6 (*b*).

In FIG. 6 (*a*) there has been illustrated the left-hand part of the arrangement in FIG. 4, in which the balancing impedance 15 is constituted by a resistance $15_1$ in parallel with a capacitor $15_2$. In FIG. 6 (*b*), the triangle constituted by the resistances $14_1$, $14_2$ and part of the resistance $15_1$, is transformed into a star, which makes it possible to form a voltage divider $18_2$ (FIG. 6 (*b*)), the intermediate point of which is grounded through the resistance $18_1$.

The arrangements according to the invention which are illustrated in FIGS. 3 and 4 are capable of variations.

FIG. 7 and 8 illustrate two variants. In these figures, the elements which are common to the arrangements of FIGS. 3 and 4 bear the same reference numerals.

The arrangement in FIG. 7 comprises, in place of the two resistances $14_1$ and $14_2$ (FIGS. 3 and 4), two PNP-transistors $21_1$ and $21_2$ which are connected as current injectors. From the point of view of alternating currents, these transistors have impedances of values which are much higher than those of the resistances $14_1$ and $14_2$: the term $G_3/2$ in relationship (11) may thus be regarded as negligible.

The arrangement in FIG. 8 comprises, instead of the resistances $12_{10}$, $12_{20}$ in FIG. 4, two NPN-transistors $31_1$ and $31_2$, which are connected as current injectors. It is thus possible, if so desired, to render independent of the direct-current functioning of the coupler according to the invention, the impedances 3 and 4 of value $1/g$, which can then be connected to the input terminals of the amplifiers 3 and 4.

The variants described above clearly lend themselves to the integrated circuit technique.

In conclusion, it will be shown, by means of a few illustrations, that the three-terminal electronic coupler according to the invention can have interesting applications.

It is known that telephone networks of the so-called "collective calls" type are used in the operation of railways. A telephone line follows the path of the railway line and, at each station, a telephone set is connected to the said telephone line. When the head of the line makes a call, all the station-masters lift the receiver simultaneously and listen.

The coupler according to the invention permits the formation of two collective call arrangements:

a. in one of these, the head of the line can engage in conversation with one station-master while the other station-masters listen; but, during this conversation, any one of the station-masters can cut in to ask leave to speak, b. in the other arrangement, the head of the line can converse with all the station-masters, but the latter cannot converse among themselves.

FIG. 9 shows the arrangement formed in accordance with the method of operation indicated in paragraph (a) above.

As can be seen, the station-master of station A uses the amplifiers 6A and 7C to speak to the head of the line, and the amplifier 7B to speak to the master of station B.

FIG. 10 indicates the arrangement formed in accordance with the method of operation indicated in paragraph (b) above.

In this arrangement, the amplifiers 6A, 6B, ... etc. of the station-masters are all in communication with the amplifier 7C of the head of the line.

The amplifier 6C of the head of the line is connected to all the inputs of the amplifiers 7A, 7B, etc. of the station-masters.

The two arrangements in FIGS. 9 and 10 require only a three-wire telephone line.

FIG. 11 is a diagram of units, showing a branching network, which separates signals of different frequencies, constituted by a three-terminal coupler 10 according to the invention, and a band-pass filter 100, the input terminals of which are connected to the terminals $10_1$, $10_2$ of the coupler 10.

As is known, the input impedance of the filer 100 is a real quantity for the band of passing frequencies, the result being that the coupler 10 functions normally only for the said bank of frequencies.

If a signal, applied to the terminals $10_1$, $10_3$ of the coupler 10, has a frequency which is contained within this band of frequencies, it appears at the output terminals $100_1$, $100_2$ of the filter 100. If this is not the case, it appears at the inputs $10_2$, $10_3$ of the coupler 10.

What is claimed is:

1. A three-terminal electronic differential coupler having a first terminal and a second terminal, the potentials of which are variable relative to a reference potential, and a third terminal maintained at said reference potential, wherein a two-wire telephone circuit is connected between said first and second terminals, while two lines of equal impedance of a four-wire telephone circuit are respectively connected, one between said first and third terminals, and the other between said second and third terminals, said coupler comprising a negative impedance converter formed by a circuit including transistors and symmetrical in relation to a point at said reference potential, and having, between two utilization terminals, a negative impedance substantially equal in absolute value, but of opposite algebraic sign to a passive balancing impedance connected to said converter, said two utilization terminals respectively constituting said first and second terminals and said third terminal being directly connected to said point at said reference potential.

2. A coupler according to claim 1, wherein said negative impedance converter comprises at least two cross-coupled transistors.

3. A coupler according to claim 2, wherein said negative impedance converter comprises two cross-coupled identical transistors.

4. A coupler according to claim 2, wherein said negative impedance converter uses two pairs of transistors of the same type of conductivity, each transistor of one pair having its emitter connected to the collector of a transistor of the other pair, and wherein said balancing impedance is connected between the collectors of the transistors of said other pair.

5. A coupler according to claim 2, wherein said negative impedance converter uses four transistors forming two pairs having opposite types of conductivity with the collector of each element of one pair connected to that of one element of the other pair, while said balancing impedance is connected between the emitters of the elements of the first-mentioned of said two pairs.

6. A coupler according to claim 5, wherein cross connections between the base electrode of one transistor of a pair and the collector of the other transistor of the same pair are formed by Zener diodes.

7. In a collective calls telephone network, comprising a principal calling set and a number of secondary sets which can be called simultaneously, the arrangement in which each of the said sets comprises a differential coupler according to claim 1 combined with two unidirectional amplifiers.

8. In a frequency branching system, an arrangement using a differential coupler according to claim 1, wherein said coupler is combined with a band-pass filter, the input terminals of which are connected to said first and second terminals of said coupler, and the input of said system is effected between one of the first and second terminals and the third terminal of said coupler, while the outputs of said system are constituted, on one hand, by the output terminals of said band-pass filter and, on the other hand, by the other of said second and first terminals and said third terminal of said coupler.

* * * * *